Patented June 20, 1944

2,351,614

UNITED STATES PATENT OFFICE 2,351,614

MEAT PROCESS AND PRODUCT

Claude H. Hills, Arlington, Va., and Halvar Orin Halvorson, St. Paul, Minn., assignors to Regents of the University of Minnesota, Minneapolis, Minn., a corporation of Minnesota No Drawing. Application July 3, 1941, Serial No. 401,020

14 Claims. (Cl. 99—107)

The present invention relates to a meat-packing process and product and more particularly to an improvement in butchering of meat whereby the loss of meat juices from meat during the canning or storage is substantially reduced as compared with products produced according to processes now in use.

It is a principal object of the present invention to provide an improved process of butchering meat and improving the quality of meat and meat products, and to provide such improved meat products whereby the loss of meat juice is reduced or substantially prevented during use, cooking, canning and storage.

It is another object of the invention to provide a process for butchering and treating meat products in which less acid, particularly lactic acid, is formed in the meat after slaughter, as compared with processes now in use, with consequent improvement of the color, edibility and flavor of the meat and particularly in respect to cooking qualities of the meat and loss of juice during cooking and canning.

Another object of the invention is the provision of a meat or meat product in which muscle-glycogen has been appreciably reduced prior to slaughtering, with the result that there is a lesser tendency for the meat to become acidic after slaughtering.

It is a still further object of the invention to provide a process of butchering animals in which muscle-glycogen is depleted by an induced epinephrine or epinephrine type hyperglycemia, with consequent increase in blood sugar of the animal prior to slaughtering, followed by slaughter of the animal and removal of its blood, including the increased blood sugar whereby acid formation in the carcass, due to the presence of tissue glycogen, is inhibited or reduced to a low extent.

And a still further object of the invention is to provide a process of treating meat products by means of which the desirable red coloring of the meat tissue is retained.

These and other objects will be more readily apparent when considered in conjunction with the following specification and appended claims.

In the butchering of meat, the chief post-mortem chemical reaction of the meat is the conversion of the tissue glycogen to lactic acid, as a result of enzyme activity after death, the lactic acid thus produced being sufficient to shift the pH of the tissue from about pH 7.2 for live tissue, to about pH 6.0–5.8 after the meat is butchered and allowed to cool. The development of such acidity in the meat after butchering is very rapid and is substantially completed in from two to three hours. While the development may be retarded to some degree by extremely rapid refrigeration such as which would freeze the carcass in less than two hours after slaughtering, such a method is impractical for many reasons. The lactic acid development appears to be related in some manner to the development of rigor mortis.

Excessive exudation of meat juices during the use of the meat, as during ordinary cooking or canning operations has been found to parallel the development of acidity. The exudation or throwing off of juice during cooking has been observed especially in the industry of canning meats wherein in some instance as much as 28–30% of the weight of the meat is thrown off as meat juices.

An example of this effect occurs in the canning of pork or hams. In this industry, the animals are butchered, the meat trimmed and then after suitable processing are canned as "canned ham" or "canned pork," either in the whole form or as ham or pork products such as ham loaf. Where such pork or ham is canned, the chilled product is placed into the can, the can is sealed and then the filled and sealed can is subjected to suitable sterilization temperatures ranging from 160° F. to 240° F. for from 20 to 240 minutes. Upon subsequently opening a can of such product, it is frequently found that the total amount of free juices in the can, including the exuded fat, amounts to 28–30% of the original product. This constitutes such a severe loss as to render difficult the marketing of the product.

A similar action is found in the canning of beef, in which process the loss of juices is frequently so severe that such canning operations are uneconomical and not commercially feasible in the United States. As a result, the practice of canning beef has been limited to meat producing countries such as the Argentine in South America where due to low cost of beef, large losses may be tolerated.

We have discovered that the loss of juices during the canning of meat and also to a considerable extent during ordinary cooking of meat may be correlated with the development of acidity in the meat after butchering and the development of acidity in turn apparently depends to a considerable extent upon the supply of tissue glycogen which is present in the tissue of the live animal at the time of slaughtering. For reasons which are not understood, the problem of acidity development, and consequent throwing off of juices, varies widely with the seasons, the effect in pork being much worse during the spring months. Indeed, the loss of juice during the canning of hams is so severe during the spring months as to render the canning of pork sometimes impractical at such time.

According to the present invention, the animal being slaughtered is injected with a glycogenolysis-producing agent at a predetermined interval prior to slaughter, and as a result, the muscle-glycogen normally in the muscle tissue is mobilized and finds its way into the blood as blood sugar and blood sugar derivatives.

At a predetermined time after the injection of the glycogenolysis-producing agent, preferably at a time when the maximum mobilization of muscle glycogen has occurred, the animal is slaughtered and blood drained therefrom according to usual slaughterhouse practice. As a result, the butchered meat contains a lesser amount of glycogen than it would if such glycogen mobilization had not occurred, and consequently much less lactic acid subsequently develops in the muscle tissue of the butchered meat.

As the agent for producing glycogenolysis, epinephrine is preferably used, although equivalent agents may be used to produce the same or an analogous result. Thus, both natural and synthetic epinephrine perform an analogous function and the widely used epinephrine-hydrochloride is equally efficacious. Likewise, other salts where available may be used, and less active mixtures such as the dextro-rotatory variety of epinephrine also gives good results. Dosages, prescribed more in detail below, are, of course, varied in accordance with the effectiveness of the agent as compared with epinephrine.

In carrying out the invention, there is preferably injected intramuscularly from 0.02 mg. to 1.0 mg. of epinephrine per kilogram of body weight of the live animal, the preferred amount being from 0.15 to 0.4 mg. per kilogram of body weight. Where some other agent other than epinephrine is used, the amount of the dosage is made equivalent in hyperglycemia producing effect to 0.02 to 1.0 mg. of epinephrine per kilogram of body weight. When injected intramuscularly, about three hours usually elapses until the maximum amount of glycogen has been mobilized and converted into blood sugar. The period elapsing between the time of injection and the time of maximum glycogen mobilization varies with different animals, being more rapid in some species than in others, it varies with the season of the year and likewise varies considerably with the manner of injection, being most rapid where the injection is made intravenously.

Concerning the manner of injection: The injection may be performed intramuscularly, intravenously, intraperitoneal, the latter two being the most rapidly effective. There does not seem to be any marked advantage in the intravenous or intraperitoneal injection methods as compared with the intramuscular injection, and the latter is therefore preferred because the longer period of reaction allows better control. When using the intramuscular method, there may be a considerable variation from the preferred three-hour period between time of injection and slaughtering inasmuch as the glycogen mobilization appears to increase gradually and a period of considerable mobilization is maintained over an extended period prior to and subsequent to the actual maximum. It has been found that an injection of epinephrine from two to three hours before slaughtering produces a marked hyperglycemia and depletion of the muscle glycogen, during which the normal tissue glycogen of 0.5% is reduced to about 0.1 to 0.2%. Where butchering is carried out when the muscle glycogen is thus reduced to a low level, the net result is usually a decrease in the amount of acidity produced in the meat as compared with controls where no such injection is made, and there is a decrease in the percent of juice which cooks out of the meat when it is used or canned.

The invention is illustrated by the following examples which are merely illustrative and are not to be interpreted as limitations upon the invention described and claimed.

Example I

As an example, two hogs weighing 200 to 300 pounds were given intramuscular injections of epinephrine, the amount injected into the first hog being 1 mg. of epinephrine per kilogram of body weight, and in the second hog the equivalent of 0.25 mg. of epinephrine per kilogram of body weight. A control, in which no epinephrine was used, was simultaneously carried out for comparative purposes. Three hours after the injections were made, all of the hogs were slaughtered according to usual practices and were placed in a cooler for twenty-four hours at 40° F. Two or three pounds of lean tissue were cut from corresponding hams of each of the three carcasses and the tissue was then cut into thin strips. The three portions of cut pieces of meat were then held at 2° C. for twenty-four hours as in usual practice. The amount of liquid exuded by the meat during the 2° C. storage for twenty-four hours is recorded in the table below as "Exudate."

At the end of the 2° C. storage for twenty-four hours, the meat was ground, mixed with 5% sodium chloride salt for cure, then placed in cans and cooked for sixty minutes at 220° F. The cans were then cooled and opened and the amount of juice determined as the difference in weight of the meat before and after cooking. The results are tabulated as follows:

| Hog | Treatment | pH just before canning | Per cent juice | | | Per cent of protein soluble 10% KCl |
|---|---|---|---|---|---|---|
| | | | Exudate | Cooked juice | Total | |
| First | 1.0 mg./kg. body weight | 5.70 | 8.02 | 11.3 | 19.5 | 56.6 |
| Second | 0.25 mg./kg. body weight | 6.84 | 0.4 | 0.0 | 0.4 | 70.3 |
| Control | None | 6.02 | 5.4 | 20.1 | 25.5 | 53.3 |

It will thus be observed that where the amount of epinephrine injected amounts to 0.25 mg. per kilogram of body weight, the pH of the butchered meat juice prior to canning was 6.84. This is a much higher pH than the average since the range of pH of the meat for hogs killed in the usual manner ranges from about pH 6.2 to pH 5.5 with an average of about 5.85. It may also be observed that using 0.25 mg. of epinephrine per kilogram of body weight, gave virtually no juice, as compared with 25.5 per cent total juice in the control hog. In both of the hogs in which epinephrine injections were made, the ground meat was a deep red. The larger dosage of epinephrine i. e. that in which 1.0 mg. of epinephrine per kilogram of body weight was used, was apparently too high for the particular hog there undergoing butchering, and this probably accounts for the relatively low pH and relatively high cooked juice for this sample, although it may be noted that the cooked juice even in this instance was 6% less than in the control hog. The percentage of 10% KCl soluble protein markedly increased where the epinephrine injections were used, as compared with the control hog.

*Example II*

As an example of smaller injections of epinephrine, the following is given:

Two hogs were given injections of epinephrine, the first being given 0.25 mg. per kilogram of body weight, and the second being given 0.15 mg. per kilogram of body weight. A control hog was included as a basis of comparison. In this experiment, the time interval between injection and slaughter was three hours, the meat being cut from the carcass after about twenty-four hours of cold storage, and then canned immediately, in the manner set forth in the preceding example.

The results were as follows:

| Hog | Treatment | pH just before canning | Percentage of cooked juice |
|---|---|---|---|
| First | 0.25 mg./kg. body weight | 6.00 | 16.9 |
| Second | 0.15 mg./kg. body weight | 6.62 | 11.7 |
| Control | No treatment | 5.83 | 25.0 |
|  | Mixture of 50% meat from "control" and 50% of meat from the "second" hog | | 21.7 |

In this example, the smaller dosage of epinephrine gave better results both as to the pH and as to the cooked juice than the higher dosage of epinephrine. This is attributed to individual idiosyncrasies in the animals undergoing butchering.

*Example III*

By way of illustration of the effect produced by varying the interval of time between injection and slaughtering, and further illustrating the variations produced under the same time conditions, by using varying amounts of epinephrine, the following is given:

Six hogs, weighing from 220 to 235 pounds were given intramuscular injections of epinephrine at intervals, the first group two hours and fifteen minutes before slaughtering, and in the second group three hours and fifteen mnutes before slaughtering. After slaughtering, the carcasses were stored for twenty-four hours at 2° C. and samples of meat taken from corresponding parts of the several carcasses ground and cooked according to the procedure set forth in Example I.

A determination of the pH of the meat after a usual twenty-four hours storage at 2° C. and the percent of juice thrown off in cooking was likewise determined. The results are tabulated as follows:

| Hog | Dosage epinephrine mg./kg. body weight | Interval between injection and slaughter | | pH | Percentage cooked juice |
|---|---|---|---|---|---|
| GROUP I | | | | | |
| | | Hrs. | Minutes | | |
| Control 1 | None | 2 | 15 | 5.48 | 23.7 |
| Red | 0.20 | 2 | 15 | 5.60 | 25.3 |
| White | 0.04 | 2 | 15 | 5.57 | 18.3 |
| GROUP II | | | | | |
| Control 2 | None | 3 | 15 | 5.50 | 28.5 |
| First | 0.25 | 3 | 15 | 6.54 | 7.7 |
| Second | 0.15 | 3 | 15 | 6.12 | 15.0 |

The results of the cooking tests agree with the results shown in the foregoing examples and demonstrate the correlation between the high pH and a low amount of cooking juice which develops on cooking. Thus, where the pH is maintained above pH 6.0 (for the first and second hogs of the second group), a satisfactory small amount of juice was developed upon cooking. The time interval of 2 hours and 15 minutes is considered as somewhat too short for animals of the type used in this example, although at some seasons of the year, or when using some breeds of animals, such a short period appears to be satisfactory.

Where the interval was 3 hours and 15 minutes between injection and slaughter, very satisfactory results were obtained in both cases, the 15% cooked juice (for the second hog of Group II) being not too large for commercial production, and the 7.7% cooked juice of the first hog of the second group being an exceedingly small amount as compared with the amount of juice produced under normal conditions, as illustrated by the control hogs of each group.

The method of the present invention is equally applicable to other animals such as beeves, sheep, horses (as in the dog food industry), and in the specialties canners utilizing small animals.

The epinephrine injected into the animal tissue is rapidly inactivated. Thus, fresh pork tissue inactivates large amounts of added epinephrine or epinephrine hydrochloride, the rate of inactivation being about 4% of the amount added at 15 minutes, 25% in one hour, 50% in twenty-four hours, 87% in two days and 91% in three days. It is thus apparent that any small percentage of the small amount of epinephrine present in the animal tissue after slaughtering is rapidly inactivated.

The epinephrine when injected in the animal tissue apparently not only mobilizes the glycogen as blood sugar, but to some extent also produces a vasoconstrictive action and as a result the blood capillaries appear to hold some of the tissue fluids mechanically and thus prevent loss of the juice during cooking or canning.

While the intramuscular method of injection is preferred, it is to be clearly understood that the epinephrine may be given intravenously or by injection into the peritoneal cavity, etc., the most noticeable effect of such variations being in the rapidity of the effects produced. That is to say where the injection is made intravenously, the effects are quite rapid and accordingly a much smaller time may be permitted to elapse between the time of injection and the time of slaughtering. Injections made into the peritoneal cavity produce results which, so far as the rapidity of glycogen mobilization is concerned, falls intermediate between the time period resulting from intramuscular and intravenous injection. As previously stated, it is the purpose of the injected reagent to produce glycogen mobilization and conversion into blood sugar, and this effect may be produced with equal facility using various places of injection in the animal and various injected ingredients having the glycogen mobilization function.

Many obvious variations will be apparent to those skilled in the art and such are intended to be within purview of the invention illustrated, described and claimed.

We claim as our invention:

1. The process which comprises injecting from 0.02 mg. to 1.0 mg. of epinephrine per kilogram of body weight into a living animal thereby causing depletion of tissue glycogen and then slaughtering the animal after an interval of from approximately 1 to 4 hours whereby development of acidity in the meat carcass is minimized.

2. A process which comprises treating a living animal with a hyperglycemia producing agent equivalent in its hyperglycemia producing function to the intramuscular injection of 0.02 to 1.0 mg. of epinephrine per kilogram of body weight of the animal, thereby mobilizing muscle-glycogen as blood sugar, slaughtering the animal after a suitable interval of time has elapsed, draining the blood from the animal whereby development of acidity in the meat carcass is minimized.

3. The process which comprises injecting a living animal with from 0.02 mg. to 1.0 mg. of hyperglycemia producing agent per kilogram of body weight, thereby mobilizing muscle-glycogen as blood sugar, slaughtering the animal after a suitable interval of time has elapsed, draining blood from the animal whereby development of acidity in the meat carcass is minimized.

4. In the process of improving the water-retention capacity of meat carcasses after slaughtering, the steps which comprise injecting about 0.15 to 0.40 mg. of epinephrine per kilogram of body weight into a living animal thereby producing increase glycogenolysis and hyperglycemia of the tissues, slaughtering the animal, and draining blood from the animal whereby development of acidity in the meat carcass is minimized.

5. A meat characterized in that the muscle-glycogen has been appreciably reduced by the injection of epinephrine into the animal from which said meat is produced, prior to slaughter in accordance with the process of claim 1, said meat having a pH less acid than pH 5.80.

6. The process which comprises hydrolyzing muscle-glycogen to sugar by artificially inducing hyperglycemia in a live animal prior to slaughtering by injecting into said live animal a hyperglycemia inducing agent, permitting substantially a maximum conversion of glycogen to blood sugar to occur in said live animal, then slaughtering the animal, and draining blood therefrom whereby a minimal amount of muscle glycogen remains in the carcass after slaughtering and development of lactic acid is minimized.

7. The process which comprises hydrolyzing muscle-glycogen to sugar by an artificially induced epinephrine hyperglycemia in the animal prior to slaughtering by injecting a suitable quantity of epinephrine into a live animal, permitting substantially a maximum conversion of glycogen to blood sugar to occur, then slaughtering the animal, and draining blood therefrom whereby a minimal amount of muscle-glycogen remains in the carcass after slaughtering and development of lactic acid is minimized.

8. A meat product of improved cooking quality having a relatively low lactic acid content as a result of treatment of the live animal from which said meat product is produced with a suitable amount of a hyperglycemia producing reagent prior to butchering the animal, in accordance with the process of claim 3.

9. A meat product of improved cooking quality having a relatively low lactic acid content as a result of treatment of the live animal from which said meat product is produced with a suitable amount of epinephrine prior to butchering the animal, in accordance with the process of claim 1.

10. In a process of improving the juice-retention capacity of meat after slaughtering, the step comprising the injection into an animal before slaughter of a hyperglycemia producing reagent prior to butchering the animal.

11. In a process of improving the juice-retention capacity of meat after slaughtering, the step comprising the injection into an animal before slaughter of a glycogen converting agent selected from the group consisting of epinephrine and epinephrine hydrochloride.

12. The process as set forth in claim 1 in which the epinephrine is injected intramuscularly.

13. The process as set forth in claim 2 in which the hyperglycemia-producing agent is injected intramuscularly.

14. The process as set forth in claim 3 in which the hyperglycemia-producing agent is injected intramuscularly.

CLAUDE H. HILLS.
H. ORIN HALVORSON.